US010267279B2

(12) United States Patent
Sauvetre et al.

(10) Patent No.: US 10,267,279 B2
(45) Date of Patent: Apr. 23, 2019

(54) CONTROL VALVE ASSEMBLY AND FUEL INJECTOR INCORPORATING A CONTROL VALVE ASSEMBLY

(71) Applicant: DELPHI TECHNOLOGIES IP LIMITED, St. Michael (BB)

(72) Inventors: Ludovic Sauvetre, Cellettes (FR); David Bonneau, Blois (FR); Philippe Barbier, Cellettes (FR); Philippe Legrand, St. Gervais la Foret (FR)

(73) Assignee: DELPHI TECHNOLOGIES IP LIMITED (BB)

( * ) Notice: Subject to any disclaimer, the term of this patent is extended or adjusted under 35 U.S.C. 154(b) by 34 days.

(21) Appl. No.: 14/774,299

(22) PCT Filed: Feb. 26, 2014

(86) PCT No.: PCT/EP2014/053670
§ 371 (c)(1),
(2) Date: Sep. 10, 2015

(87) PCT Pub. No.: WO2014/139792
PCT Pub. Date: Sep. 18, 2014

(65) Prior Publication Data
US 2016/0017852 A1 Jan. 21, 2016

(30) Foreign Application Priority Data

Mar. 13, 2013 (EP) ..................... 13158969

(51) Int. Cl.
*F02M 61/04* (2006.01)
*F02M 63/00* (2006.01)
(Continued)

(52) U.S. Cl.
CPC .......... *F02M 61/04* (2013.01); *F02M 47/027* (2013.01); *F02M 61/167* (2013.01);
(Continued)

(58) Field of Classification Search
CPC ............... F02M 51/061; F02M 51/055; F02M 51/0642; F02M 51/0639; F02M 51/0653;
(Continued)

(56) References Cited

U.S. PATENT DOCUMENTS

| 7,140,353 | B1 * | 11/2006 | Rauznitz | ............. | F02M 47/027 |
|           |      |         |          |              | 123/446 |
| 2003/0127614 | A1 * | 7/2003 | Haeberer | ............. | F02M 47/027 |
|           |      |         |          |              | 251/50 |
| 2007/0278329 | A1 * | 12/2007 | Facchin | ............. | F02M 51/0671 |
|           |      |         |          |              | 239/533.2 |

FOREIGN PATENT DOCUMENTS

DE   10 2006 049830 A1   4/2008
DE   10 2006 050811 A1   4/2008
(Continued)

OTHER PUBLICATIONS

International Search Report dated Apr. 22, 2014.

*Primary Examiner* — Alexander M Valvis
*Assistant Examiner* — Christopher R Dandridge
(74) *Attorney, Agent, or Firm* — Joshua M. Haines

(57) ABSTRACT

A control valve assembly for controlling fuel pressure in a control chamber of a fuel injector. The control valve assembly comprising a valve member arranged in a bore provided in a valve housing, at least one of the valve member and the valve housing being moveable with respect to the other, wherein the valve member comprises a fuel-receiving cavity arranged to receive fuel that distorts at least a portion of the valve member so as to increase an external dimension thereof.

15 Claims, 7 Drawing Sheets

(51) Int. Cl.
 *F02M 61/16* (2006.01)
 *F02M 47/02* (2006.01)
 *F02M 61/18* (2006.01)
 *F16K 11/065* (2006.01)
 *F02M 55/00* (2006.01)

(52) U.S. Cl.
 CPC .......... *F02M 61/18* (2013.01); *F02M 63/004* (2013.01); *F02M 63/0078* (2013.01); *F16K 11/065* (2013.01); *F02M 55/008* (2013.01); *F02M 63/0033* (2013.01); *F02M 63/0043* (2013.01); *F02M 63/0073* (2013.01); *F02M 2200/8053* (2013.01)

(58) Field of Classification Search
 CPC .... F02M 51/0671; F02M 51/10; F02M 51/06; F02M 51/0603; F02M 51/0675; F02M 51/0682; F02M 61/18; F02M 61/10; F02M 59/366; F02M 59/466; F02M 61/04; F02M 61/042; F02M 61/167; B05B 17/06; B05B 17/0606
 USPC .............................................. 239/585.1–586
 See application file for complete search history.

(56) References Cited

FOREIGN PATENT DOCUMENTS

| DE | 102009026532 | * | 2/2010 | ............. F02M 47/02 |
| EP | 1 612 403 A1 | | 1/2006 | |
| WO | WO2008049665 | * | 5/2008 | ............. F02M 47/02 |

* cited by examiner

CONTROL VALVE ASSEMBLY AND FUEL INJECTOR INCORPORATING A CONTROL VALVE ASSEMBLY

CROSS REFERENCE TO RELATED APPLICATIONS

This application is a national stage application under 35 U.S.C. 371 of PCT Application No. PCT/EP2014/053670 having an international filing date of 26 Feb. 2014, which designated the United States, which PCT application claimed the benefit of European Patent Application number 13158969.9 filed on 13 Mar. 2013, the entire disclosure of each of which are hereby incorporated herein by reference.

FIELD OF THE INVENTION

This invention relates to a control valve assembly for controlling fuel pressure in a control chamber. In particular, the invention relates to a control valve assembly for controlling fuel pressure in the control chamber of a fuel injector for use in a fuel injection system of an internal combustion engine. The invention also relates to a fuel injector incorporating a control valve assembly.

BACKGROUND TO THE INVENTION

In common rail fuel systems for diesel engines, fuel is delivered from an accumulator to each cylinder of an engine by a dedicated fuel injector. Each fuel injector comprises a valve needle that is moveable relative to a seating to permit or arrest the delivery of fuel. Movement of the valve needle towards and away from the seating is controlled by balancing opposed closing and opening forces. Fuel in a delivery chamber exerts an opening force on an end of the valve needle nearest the seating, which acts to lift the needle away from the seating. Fuel in a control chamber exerts a closing force on an end of the valve needle remote from the seating, which acts to force the needle against the seating.

The balance of the opening and closing forces is controlled by controlling fuel pressure in the control chamber. When the pressure in the control chamber is high, the closing force on the needle is sufficient to overcome the opening force exerted by the fuel in the delivery chamber, and the valve needle is retained in a closed position against the valve seating. When the fuel pressure in the control chamber is relatively low, the closing force is lower than the opening force, and the valve needle is lifted from the seating into an open position, such that fuel is injected into the engine cylinder.

FIG. 1 illustrates in cross-section a known control valve assembly 10 for use in controlling the fuel pressure in such a control chamber 12. A valve member 14 is moveable with respect to a housing 16 between a closed position and an open position by means of an actuator 18, such as a solenoid. In the closed position, the control chamber 12 is in communication with a high-pressure fuel supply 20. Fuel pressure in the control chamber 12 is therefore high. In the open position of the control valve 10, the control chamber 12 and the high-pressure fuel supply 20 are in communication with a fuel passage 22 that leads to a low-pressure drain (not shown). Pressure in flow passages 24 in the control valve and in the control chamber 12 is therefore relatively low. In this way, the control valve assembly 10 controls the pressure in the control chamber 12, which in turn controls the fuel injection.

In such control valves, the fuel in the flow passages 24 is prone to leakage, which leads to fuel loss, and hence leads to energy loss. This energy loss is undesirable because it decreases efficiency of the engine and results in increased $CO_2$ emissions.

Leakage can occur during opening and/or closing of the valve 10, known as dynamic leak, and/or when the control valve 10 is in the closed position, known as static leak. Static leak is particularly significant as the control valve 10 is in the closed position for the majority of its lifetime. A major source of static leak is a clearance 26 between the valve member 14 and the surrounding housing 16. The clearance 26 must exist to allow for sliding movement of the valve member 14 with respect to the housing 16; however, the clearance 26 provides an undesirable pathway through which high-pressure fuel may leak out of the flow paths 22 of the control valve 10.

It will be appreciated that when the control valve 10 is in the closed position, the flow paths 22 within the control valve contain high-pressure fuel. The high operating pressures of today's fuel injectors mean that fuel in the flow paths 22 is typically at pressures of at least 2000 bar; high enough that fuel within the flow paths 22 exerts a pressure on the surrounding components that is sufficient to cause significant distortion.

Specifically, the high-pressure fuel in the flow paths 22 exerts an outward radial force on the housing 16, and an inward radial force on the valve member 14. The distortion forces the two components apart in the region of the flow paths 22. Away from the flow paths 22, the strain relaxes. However, the relaxation is gradual, and thus the housing 16 and the valve member 14 are still subject to distortion in the region of the clearance 26 between the valve member 14 and the housing 16. This distortion increases the size of the clearance 26 between the valve member 14 and the housing 16, and hence increases the tendency for leakage.

It is with a view to addressing the aforementioned disadvantage that the present invention provides an improved control valve assembly for a fuel injection system for an internal combustion engine.

SUMMARY OF THE INVENTION

Against this background, a first aspect of the invention resides in a control valve assembly for controlling fuel pressure in a control chamber of a fuel injector, the control valve assembly comprising a valve member arranged in a bore provided in a valve housing, at least one of the valve member and the valve housing being moveable with respect to the other, wherein the valve member comprises a fuel-receiving cavity arranged to receive fuel that distorts at least a portion of the valve member so as to increase an external dimension thereof.

The invention provides a control valve assembly in which undesirable distortion effects caused by fuel in the bore of the control valve can be counteracted. The undesirable distortion effects tend to increase a diameter of the bore, causing leakage between the valve member and the valve housing. In the control valve of the invention, these effects are counteracted by means of the fuel-receiving cavity provided in the valve member. Fuel received in the fuel-receiving cavity causes an intentional distortion of the valve member, which increases an external diameter of the valve member, compensating for the increase in the diameter of the bore. By counteracting the distortion effects, leakage of fuel from the control valve between the valve member and the valve housing is reduced. This decreases the energy consumption and hence increases the efficiency of an engine provided with the control valve assembly.

Preferably, at least one of the valve member and the valve housing is engageable with a valve seating to control fuel pressure within the control chamber, and fuel pressure within the fuel-receiving cavity is variable depending on whether the valve member is engaged with the valve seating. In this way, the pressure in the fuel-receiving cavity can be varied to match the pressure in the control valve, such that the intentional distortion of the valve member occurs only to the extent that is required.

In preferred embodiments, the valve member comprises an annular wall surrounding the fuel-receiving cavity, so that fuel received in the fuel-receiving cavity exerts an outward radial force on at least a portion of the annular wall, so as to increase its external diameter. The annular wall is easily and uniformly distorted by the fuel in the fuel-receiving cavity, which reduces stresses exerted on the valve member and the valve housing as a result of the intentional distortion.

The valve member may comprise a valve body arranged in a close sliding fit in the bore, and at least a portion of the fuel-receiving cavity may extend into the valve body. Leakage between the valve member and the valve housing is particularly significant at a region of close-sliding fit, so extending at least a portion of the fuel-receiving cavity into the valve body advantageously helps to ensure that distortion in this region is counteracted, thereby reducing leakage still further.

Preferably, the bore is arranged to receive fuel from a high-pressure fuel supply. In this case fuel received in the bore may act to distort the valve housing and/or the valve member so as to increase a radial clearance defined between the valve body and a wall of the bore. In this embodiment, the bore may define a fuel gallery for receiving fuel from the high-pressure fuel supply, and fuel received in the fuel gallery may act to distort the valve housing and/or the valve member so as to increase the radial clearance.

In this case, fuel received in the fuel-receiving cavity preferably acts to distort the valve body so as at least partially to counteract the increase in the radial clearance caused by the fuel received in the bore.

In preferred embodiments, the fuel-receiving cavity is in fluid communication with the fuel gallery, such that fuel pressure in the fuel-receiving cavity is substantially the same as fuel pressure in the fuel gallery. Ensuring the same fuel pressure in the fuel gallery and the fuel-receiving cavity guards against a situation where, for example, the pressure in the fuel-receiving cavity is too low, so that the external diameter of the valve member is not sufficiently increased, and the clearance remains large enough to cause significant leakage, and also guards against a situation where the pressure in the fuel-receiving cavity is too high, such that the external diameter of the valve member increases too much, introducing an unacceptable degree of friction between the valve member and the valve housing.

Preferably, the fuel-receiving cavity is arranged in fluid communication with the fuel gallery by means of an inlet, such as a cross-drilling, that is in fluid communication with the fuel-receiving cavity and the fuel gallery.

In preferred embodiments, when fuel is absent from the bore and the fuel-receiving cavity, the valve body is of substantially constant external diameter.

For ease of manufacture, the fuel-receiving cavity is preferably a drilled cavity. To prevent fuel escaping from the fuel-receiving cavity, the drilled cavity may be plugged by an insert.

To control pressure in the control chamber of the injection valve, at least one of the valve member and the bore is preferably moveable with respect to the other between a first position in which the control chamber, the fuel-receiving cavity and a high-pressure fuel supply are arranged in mutual fluid communication, and a second position in which the control chamber is in fluid communication with a low-pressure fuel drain. For example, the valve member may be moveable with respect to the valve housing. Alternatively, the valve housing may be moveable with respect to the valve member.

The invention also extends, in a second aspect, to a fuel injector comprising a control valve assembly as described above, a control chamber, and an injection nozzle, the control chamber being arranged to control movement of a valve needle to control the injection of fuel from the injection nozzle.

It will be appreciated that preferred and/or optional features of the first aspect of the invention may be incorporated alone or in appropriate combination in the second aspect of the invention also.

BRIEF DESCRIPTION OF THE DRAWINGS

FIG. 1 has already been described above with reference to the prior art. In order that the invention may be more readily understood, preferred non-limiting embodiments thereof will now be described with reference to the remaining accompanying drawings, in which:

Throughout the remainder of this document, terms such as 'above', 'below', 'upwardly', 'downwardly' and so on are used with reference to the orientation of the control valve in the accompanying drawings. However, it will be appreciated that a control valve according to the present invention could be used in any orientation. Terms such as 'upstream' and 'downstream' are used with reference to the direction of fuel flow in use of the control valve, during opening or closing of the control valve, or otherwise as the context demands.

DETAILED DESCRIPTION OF EMBODIMENTS OF THE INVENTION

Figure 1:
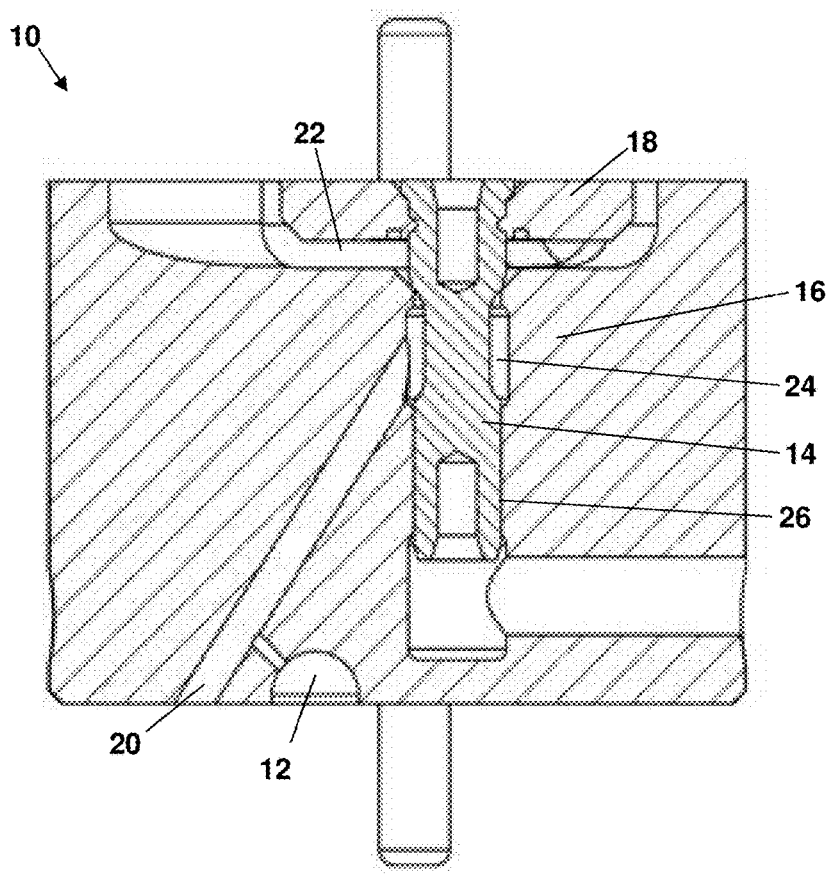
Figure 2:
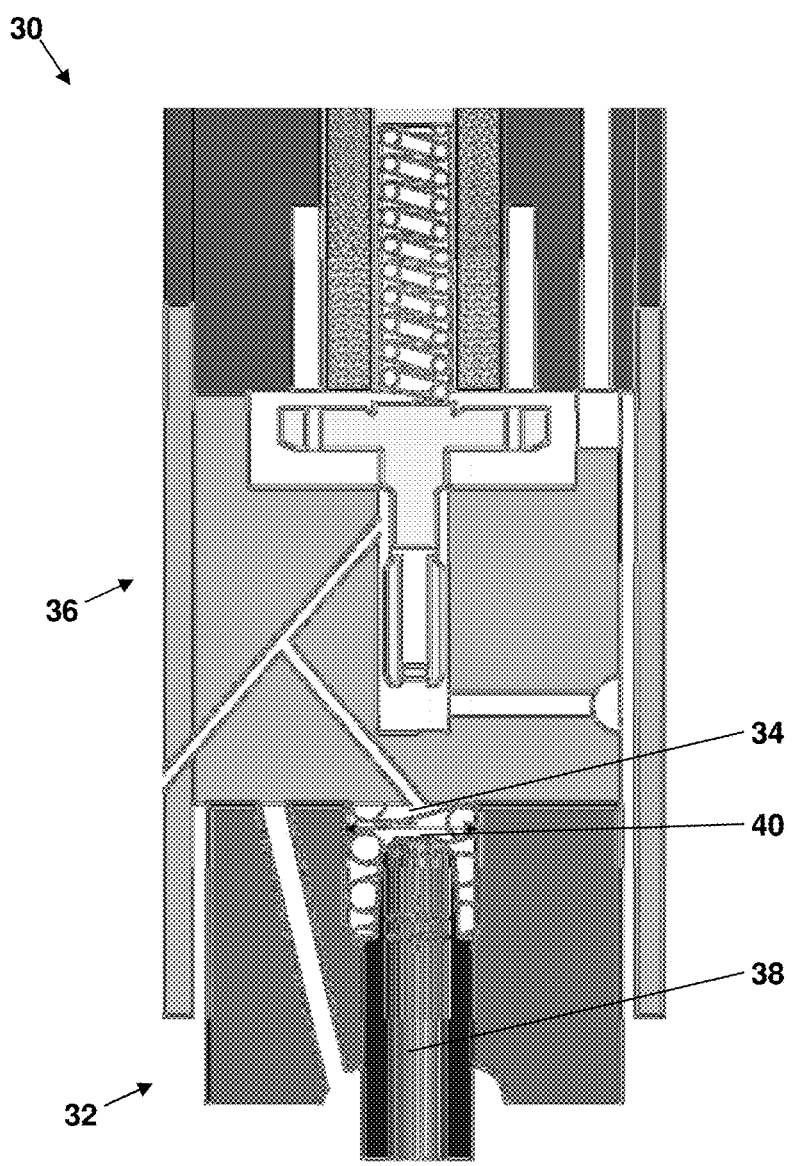
FIG. 2 is a front cross-sectional view of a fuel injector comprising a control valve assembly according to a first embodiment of the invention.

Referring to FIG. 2, a fuel injector 30 for use in delivering fuel to an engine cylinder of an internal combustion engine (not shown) comprises an injection nozzle 32, a control chamber 34 and a control valve 36 according to the invention. The injection nozzle 32 comprises a valve needle 38 that is moveable with respect to an injection valve seating (not shown) between an open position, in which delivery of fuel into the engine cylinder is permitted, and a closed position, in which delivery of fuel is arrested.

The control chamber 34 contains fuel that exerts a closing force on an end 40 of the valve pin 38 thereby acting to force the valve pin 38 against the injection valve seating. The control valve 36 controls the pressure of the fuel in the control chamber 34, so as to control the closing force and to move the valve pin 38 between the open position and the closed position.

Figure 3:
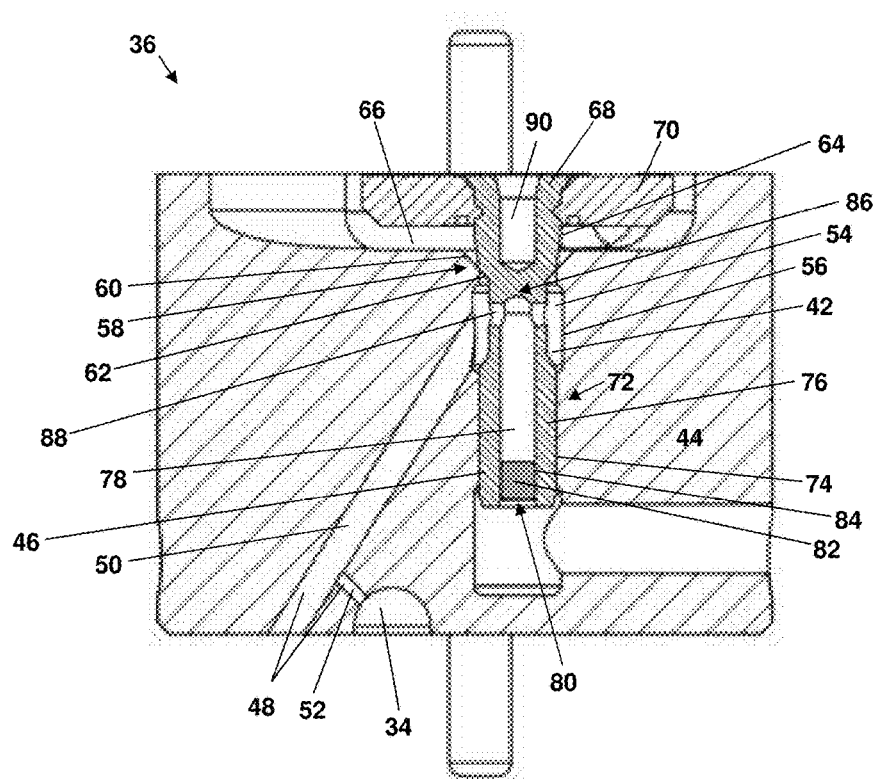
FIG. 3 is a front cross-sectional view of the control valve assembly of FIG. 2, in a closed position.

FIG. 3 illustrates a control valve 36 according to the invention in isolation from the rest of the fuel injector 30. The control valve comprises a bore 42 defined in a valve housing 44, exemplified here as a control valve block, and a valve member 46, exemplified here as a valve stem, that is slidably received in the bore 42.

Drillings 48 in the valve housing define a high-pressure fuel supply that supplies high-pressure fuel to the bore 42 of the control valve 36, and to the control chamber 34. A primary drilling 50 delivers high-pressure fuel to the bore 42 of the control valve 36, and a secondary drilling 52, branching off from the primary drilling downstream of the control valve 36, delivers fuel to the control chamber 34. The bore 42 is arranged to receive high-pressure fuel from the high-pressure fuel supply 48 via an annular fuel gallery 54, which is defined by a spacing provided between the valve stem 46 and a wall 56 of the bore 42.

Above the fuel gallery 54, the wall 56 of the bore 42 comprises a valve seating, generally indicated at 58, in the form of a frustoconical surface 60. The valve stem 46 comprises a corresponding frustoconical surface 62, of complementary shape and dimensions, such that the valve stem 46 is engageable with the valve seating 58.

Moving upwardly, above the valve seating 58, the bore 42 is in communication with a low-pressure fuel drain (not shown) via outlet openings 64 in the wall of the bore 42. The low-pressure fuel drain communicates with further drillings 66 in the valve housing 44 that drain fuel away from the bore 42, so as to increase the volume of the fuel and hence to decrease the pressure of the fuel in the control valve 36.

Continuing upwardly, the uppermost portion 68 of the valve stem 46 is arranged in contact with an actuator 70 such as a solenoid or a piezoelectric actuator. The actuator 70 acts on the uppermost portion 68 of the valve stem 46, so as to move the valve stem 46 either downwardly and into engagement with the valve seating 58, or upwardly and out of engagement with the valve seating 58.

In this way, and as will later be described in detail, the valve stem 46 is moveable within the bore 42 between a first or closed position, shown in FIG. 3, in which the valve stem 46 is in abutment with the valve seating 58, and a second, or open position, shown in FIG. 4, in which the valve stem 46 is spaced apart from the valve seating 58.

Considering now the valve stem 46 in further detail, a lower portion of the valve stem 46, located below the fuel gallery 54, defines a valve body 72 of the valve stem 46. The valve body 72 is substantially cylindrical in shape, and is of substantially constant radius. The valve body 72 is arranged in a close sliding fit within the bore 42. Specifically, the portion of the bore 42 that surrounds the valve body 72 is of substantially constant radius, that radius being slightly greater than the radius of the valve body 72. In this way, a small clearance 74 is provided between the valve body 72 of the valve stem 46 and the wall 56 of the bore 42, so as to allow for relative sliding movement between the valve stem 46 and the valve housing 72. Typically, the clearance 74 is of the order of a few microns.

The valve body 72 of the valve stem 46 is substantially hollow. Specifically, the valve body 72 of the valve stem 46 comprises an annular wall 76 that surrounds a fuel-receiving cavity 78. The internal cavity has a diameter that is between approximately 30% and approximately 60% of the diameter of the valve stem.

The fuel-receiving cavity 78 is formed, for example, by drilling into a lowermost end 80 of the valve body 72, and plugging the lowermost end with an insert 82. The insert 82 is sealed to an inner surface 84 of the annular wall 76 in a leak-tight fashion, for example by welding.

Moving from the lowermost end 80 of the valve body 72 upwards, the fuel-receiving cavity 78 extends longitudinally through the length of the valve body 72. The fuel-receiving cavity 78 continues beyond the valve body 72 of the valve stem 46, such that it extends into a region of the valve stem 46 of reduced radius that is surrounded by the fuel gallery 54 of the bore 42. The fuel-receiving cavity 78 terminates in this region of reduced radius, such that the fuel-receiving cavity 78 does not extend beyond the fuel gallery 56.

An uppermost end 86 of the fuel-receiving cavity 78 is provided with one or more inlets 88 in the form of cross-drillings. The inlets 88 are arranged to extend between the fuel-receiving cavity 78 and the fuel gallery 54, such that fuel can flow from the fuel gallery 54 into the fuel-receiving cavity 78. It will be appreciated that fuel is prevented from flowing out of the fuel-receiving cavity 78 by the insert 82 provided in the lowermost end 80 of the valve stem 46.

Continuing upwardly from the cross-drillings 88, the central portion of the valve stem 46 leads into the frustoconical surface 62 of the valve stem 46, in which region the radius of the valve stem 46 gradually increases until the radius is substantially the same as the radius of the valve body 72. Above the frustoconical surface 62, in the region of the low-pressure passages 66 and the uppermost region of the valve stem 46, the valve stem 46 is provided with a blind drilling 90. This blind drilling 90 restricts flow to the low-pressure drain, as described in the Applicant's published patent application WO 2004/005702.

The flow of fuel to, from and within the control valve 36 will now be described, with particular reference to FIGS. 3 and 4, which show the control valve 36 in the closed and open positions respectively.

Referring firstly to FIG. 3, when the control valve 36 is in the closed position, the frustoconical surface 62 of the valve stem 46 abuts the frustoconical surface 60 of the valve seating 58. In this way, the fuel path between the fuel gallery 54 and the low-pressure passage 66 is blocked. Therefore, while the high-pressure fuel supply 48, the control chamber 34, the fuel gallery 54, and the fuel-receiving cavity 78 are in mutual fluid communication, and high-pressure fuel can flow between them, fluid communication with the low-pressure passage 66 to the drain is broken. Thus, the fuel in the control valve 36 cannot drain to low pressure. Fuel in the control valve 36, and hence in the control chamber 34, therefore remains at a relatively high pressure.

It will be appreciated that when the control valve 36 is in the closed position, the fuel gallery 54 and fuel-receiving cavity 78 contain high-pressure fuel. The high-pressure fuel in the fuel gallery 54 exerts an inward radial force on the valve stem 46 and an outward radial force on the wall 56 of the bore 42 in the region of the fuel gallery 54. This causes elastic distortion of the valve stem 46 and the wall 56 of the bore 42, which tends to decrease an external diameter of the valve stem 46 and increase an internal diameter of the bore 42.

As has been described, although this elastic distortion relaxes away from the fuel gallery 54, it does so gradually, and residual strains exists in the valve stem 46 and the wall 56 of the bore 42. Thus, at the valve body 72 of the valve stem 46, elastic strain tends to decrease the external diameter of the valve stem 46 and increase the internal diameter of the bore 42, thereby increasing the clearance 74 between the valve stem 46 and the bore 42 in the region of the valve body 72. This strain is largest close to the fuel gallery 54, and gradually decreases towards the lowermost end 80 of the valve stem 46.

However, when the control valve 36 is in the closed position, the fuel-receiving cavity 78 in the valve stem 46 also receives high-pressure fuel from the fuel gallery 54, via the inlets 88. This high-pressure fuel in the fuel-receiving cavity 78 exerts an outward radial force on the annular wall 76 of the valve body 72 of the valve stem 46.

The outward radial force exerted by the fuel in the fuel-receiving cavity 78 deforms the annular wall 76 of the valve stem 46 outwardly. Specifically, the outward radial force elastically deforms the annular wall 76 so as to increase its external dimensions appreciably. Since the annular wall 76 is of uniform thickness, and the pressure provided by the fuel is uniform, the effect of the distortion is to appreciably increase an external diameter of the valve body 72 of the valve stem 46.

The tendency of high-pressure fuel in the fuel gallery 54 to decrease the external diameter of the valve stem 46 and increase the diameter of the bore 42 is therefore counteracted by the tendency of the fuel in the fuel-receiving cavity 78 to increase the external diameter of the valve stem 46. The net result is that, in a control valve 36 according to the invention, the clearance 74 between the valve stem 46 and the bore 42 of the control valve 36 is not appreciably increased by the presence of the high-pressure fuel. The risk of leakage between the valve stem 46 and the bore 42 in a control valve 36 according to the invention is therefore significantly lower than in known control valves.

As previously mentioned, the control valve 36 spends the majority of its life in the closed position. Thus, reducing the tendency for leakage between the valve stem 46 and the wall 56 of the bore 42 when the control valve 36 is in the closed position has a significant impact on the total operational leakage of the control valve 36.

Figure 4:
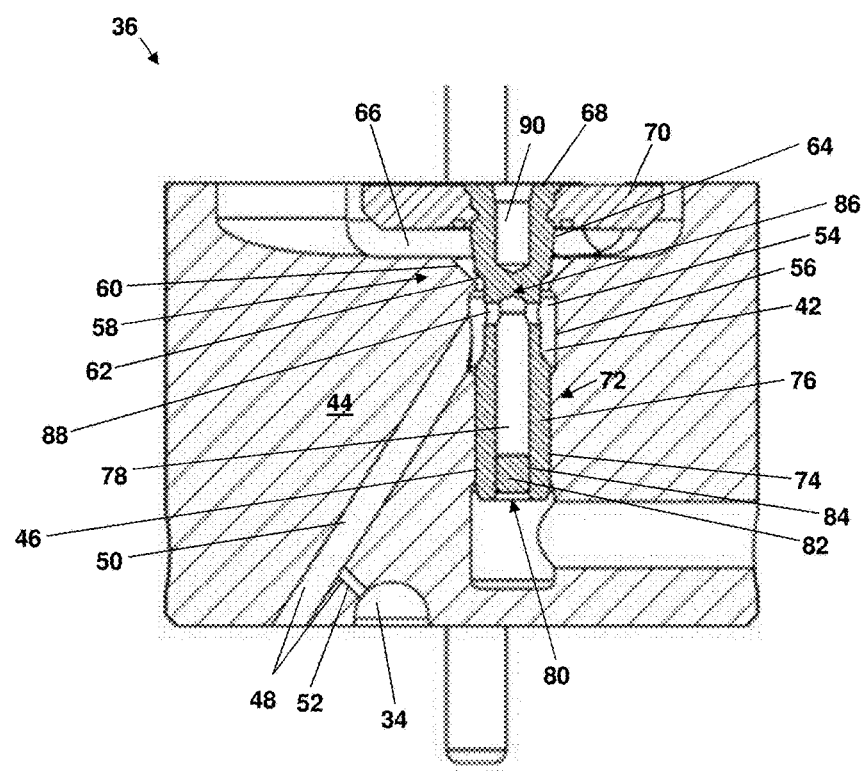
FIG. 4 is a front cross-sectional view of the control valve assembly of FIG. 2 in an open position.

Referring now to FIG. 4, when the control valve 36 is in the open position, the valve stem 46 is spaced apart from the valve seating 58, such that flow of fuel between the fuel gallery 54 and the low-pressure drain 66 is permitted. Thus, when the control valve 36 is in the open position, the high-pressure fuel supply 48, the control chamber 34, the fuel gallery 42, the fuel-receiving cavity 78 and the low-pressure fuel drain 66 are in mutual fluid communication. Fuel can therefore flow to the low-pressure fuel drain 66, and the fuel in the control valve 36 and in the control chamber 34 is at a relatively low pressure.

Thus, when the control valve 36 is in the open position, fuel in the fuel gallery 42 and the fuel-receiving cavity 78 is at relatively low pressure. The fuel in the fuel gallery 42 exerts a relatively low outward radial force on the wall 56 of the bore 42 and a relatively low inward force on the valve stem 46, causing a relatively low level of distortion. Similarly, the fuel in the fuel-receiving cavity 78 exerts a relatively low outward force on the annular wall 76 of the valve stem 46 (in comparison with when the control valve 36 is closed), causing a correspondingly low distortion that counteracts the distortion provided by the fuel in the fuel gallery 42.

It will be appreciated that the provision of the cross-drillings 88 between the fuel gallery 54 and the fuel-receiving cavity 78 means that the fuel pressure in the fuel gallery 54 is always at equilibrium with the fuel pressure in the fuel-receiving cavity 78. In this way, the fuel pressure in the fuel-receiving cavity 78 varies with the pressure in the fuel gallery 54, and hence varies depending on whether the control valve 36 is open or closed. The fuel in the fuel-receiving cavity 78 will therefore only distort the annular wall 76 of the valve body to the extent that is necessary to maintain a substantially constant clearance 74 between the valve body 72 of the valve stem 46 and the wall 56 of the bore 42.

This equilibrium between the fuel gallery 54 and the fuel-receiving cavity 78 guards against a situation where, for example, the pressure in the fuel-receiving cavity 78 is too low, so that the external diameter of the valve stem 46 is not sufficiently increased, and the clearance 74 between the valve stem 46 and the bore 42 remains large enough to cause significant leakage. The equilibrium also guards against a situation where the pressure in the fuel-receiving cavity 78 is too high, such that the external diameter of the valve stem 46 increases too much, introducing an unacceptable degree of friction between the valve stem 46 and the wall 56 of the bore 42, or even causing damage to the valve stem 46 and/or the housing 44.

In use of the injection valve 30, the control valve 36 is initially biased in the closed position by a spring (not shown), which mechanically biases the valve stem 46 against the valve seating 58. In this closed position, fluid communication between the control chamber 34 and the low-pressure drain 66 is broken. The high-pressure fuel supply 48, the control chamber 34, the fuel gallery 54 and the fuel-receiving cavity 78 are in mutual fluid communication, such that they all contain high-pressure fuel.

High-pressure fuel in the fuel gallery 54 exerts relatively high radial forces on the wall 56 of the bore 42 and the valve stem 46 that tends to increase the clearance 74 between the wall 56 of the bore 42 and the valve body 72 of the valve stem 46; however, this is compensated for by high-pressure fuel in the fuel-receiving cavity 78 that exerts a relatively high outward radial force on the annular wall 76 of the valve body 72 of the valve stem 46, thereby increasing its external diameter by a relatively large amount. In this way, the provision of the fuel-receiving cavity 78 reduces the clearance 74 and guards against leakage between the wall 56 of the bore 42 and the valve stem 46 when the control valve 36 is in the closed position.

With the control valve 36 in the closed position, high-pressure fuel in the control chamber 34 exerts a relatively high closing force on the valve pin 38 of the injection nozzle 32, thereby retaining the valve pin 38 against the injection valve seating. The injection nozzle 32 is therefore retained in a closed position, such that fuel is prevented from entering the engine cylinder.

To trigger an injection event, the actuator 70 is actuated by application of an electric current or voltage. The actuator 70 acts against the bias of the spring to lift the valve stem 46 of the control valve 36 upwardly, into the open position, such that the valve stem 46 is lifted out of engagement with the valve seating 58. In the open position, the high-pressure fuel supply, the control chamber 34, the fuel gallery 54, the fuel-receiving cavity 78 and the low-pressure drain are arranged in mutual fluid communication, such that they all contain fuel at relatively low pressure.

In the open position, the relatively low-pressure fuel in the fuel gallery 54 exerts relatively low radial forces on the wall 56 of the bore 42 and the valve stem 46 that tend to increase the clearance 74 between the wall 56 of the bore 42 and the valve body 72 of the valve stem 46 by only a relatively small amount. This is compensated for by relatively low-pressure fuel in the fuel-receiving cavity 78 that exerts a relatively low outward radial force on the annular wall 76 of the valve body 72 of the valve stem 46, thereby increasing its external diameter by a correspondingly small amount. In this way, the provision of the fuel-receiving cavity 78 guards against leakage between the wall 56 of the bore 42 and the valve stem 46 when the control valve 36 is in the open position.

With the control valve 36 in the open position, relatively low-pressure fuel in the control chamber 34 exerts a relatively low closing force on the valve pin 38 of the injection nozzle 32. This low closing force is insufficient to retain the valve pin 38 against the injection valve seating. The injection nozzle 32 is therefore moved to an open position, such that fuel is injected into the engine cylinder.

When the injection event is complete, the electric current or voltage is removed from the actuator 70 of the control valve 36. The spring biases the control valve 36 into the closed position once more, and the control valve 36 remains in the closed position until the next injection event.

Figure 5:
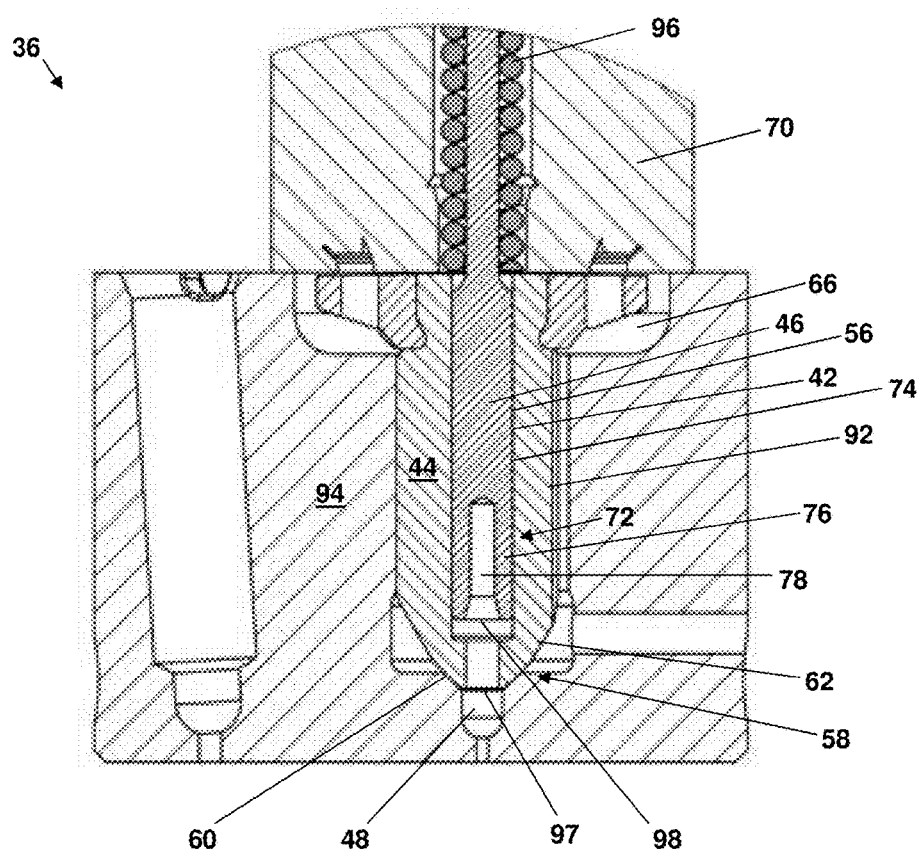
FIG. 5 is a front cross-sectional view of a control valve assembly according to a second embodiment of the invention, in a closed position.
Figure 6:
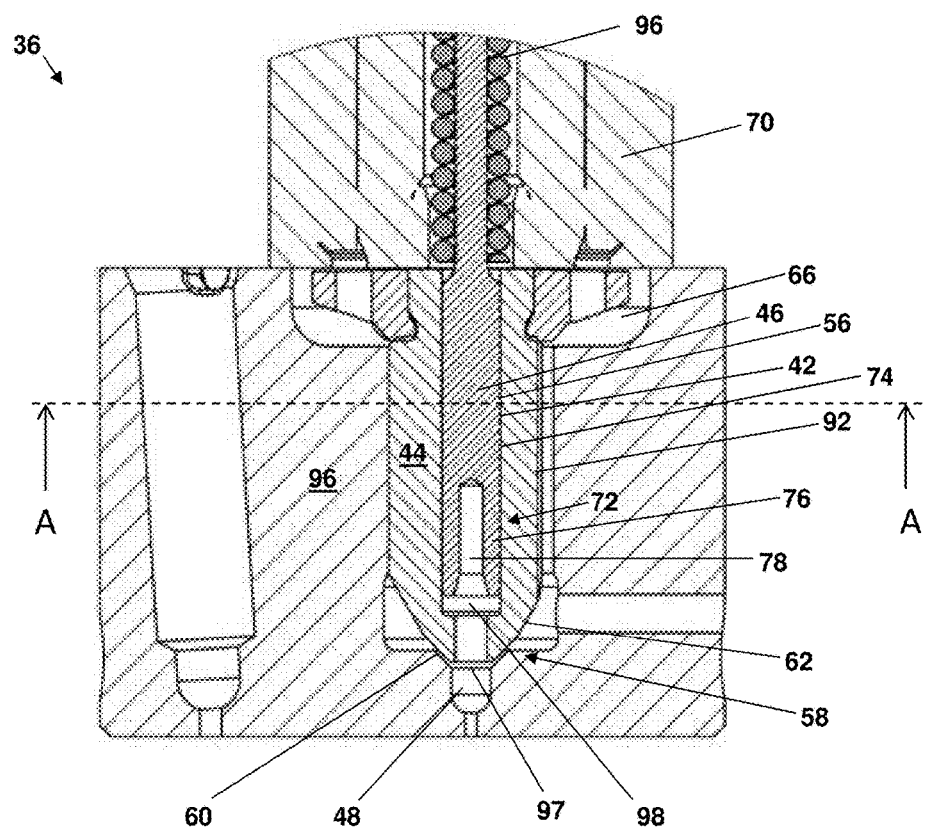
FIG. 6 is a front cross-sectional view of the control valve assembly of FIG. 5 in an open position.

FIGS. 5 and 6 illustrate a second embodiment of a control valve 36 according to the invention, in which like numbers correspond to like parts. In this alternative embodiment, the control valve 36 comprises a valve member 46 in the form of a valve pin, which is received in a bore provided in a housing 44, the housing being in the form of a valve stem 44. The valve stem 44 is located within a further bore 92 that is provided in a valve block 94. The valve stem 44 is slidable within the further bore 92, such that the valve stem 44 is moveable with respect to the valve pin 46 and with respect to the valve block 94.

In contrast to the first embodiment, in which the valve member 46 (in the form of a valve stem) is moveable while the valve housing 44 (in the form of a control valve block) remains stationary, in the second embodiment, the valve member 46 (in the form of the valve pin) remains stationary, while the valve housing 44 (in the form of the valve stem) is moveable. It will be appreciated that, in both embodiments, relative sliding movement takes place between the valve member 46 and the housing 44. Said another way, in both embodiments, at least one of the valve member 46 and the housing 44 is moveable with respect to the other.

Referring still to FIGS. 5 and 6, movement of the valve stem 44 is actuated by means of an actuator 70 that is arranged at an uppermost end of the valve stem 44. The valve stem 44 is biased downwardly into engagement with the valve seating 58 in a first or closed position by the spring 96, illustrated in FIG. 5, and the actuator 70 acts against the spring 96 to move the valve stem 44 upwardly into an open position, illustrated in FIG. 6.

At the lowermost end of the control valve 36, remote from the actuator 70, the further bore 92 comprises a valve seating 58 in the form of a frustoconical surface 60. In the region of the valve seating 58, the valve stem 44 comprises a corresponding frustoconical surface 62, of complementary shape and dimensions, such that the valve stem 44 is engageable with the valve seating 58.

Figure 7:
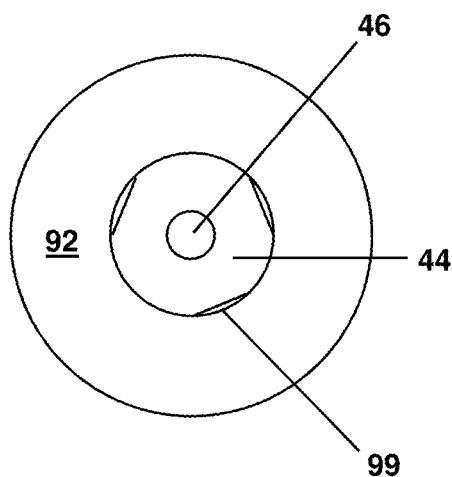
FIG. 7 is a cross-sectional view from above of the control valve assembly of FIG. 6, taken along the line A-A.
Figures 8A, 8B:
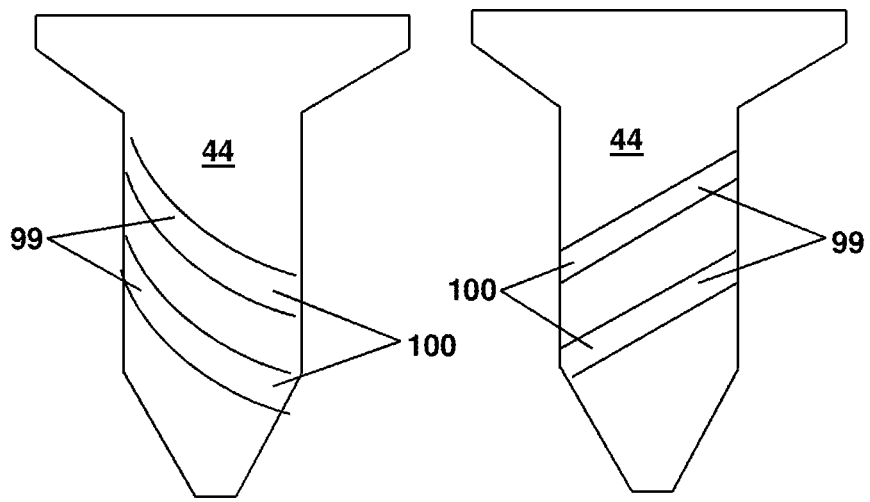
FIGS. 8a and 8b are front cross-sectional views of a valve stem of alternative embodiments of the control valve assembly of FIG. 7.

Below the valve seating 58, a high-pressure fuel supply 48 opens into the bore 42 in the valve stem 44. The high-pressure fuel enters the valve stem 44 at its lowermost end via an inlet 97. Above the valve seating 58, a low-pressure fuel passage 66 allows fuel from the bore 42 to flow to a low-pressure drain (not shown). As illustrated in FIG. 7, a low-pressure path 99 additionally exists between the valve stem 44 and the valve block 94. To provide this low-pressure fuel path 99, the valve stem 44 may be of tri-lobe configuration, as illustrated in FIG. 7, or an outer surface of the valve stem 44 may be provided by linear or planetary grooves 100, as illustrated in FIGS. 8a and 8b.

In this way, the valve seating 58 is intermediate the high-pressure fuel supply inlet 96 and the low-pressure fuel passage 66. Thus, when the valve stem 44 is arranged in the closed position, shown in FIG. 5, fluid communication between the high-pressure fuel supply 48 and the low-pressure drain is broken. When the valve stem 44 is arranged in the open position, shown in FIG. 6, fluid communication between the high-pressure fuel supply 48 and the low-pressure drain is open.

Considering now the valve pin 46 in further detail, a lower portion of the valve pin 46 defines a valve body 72 of the valve pin 46, which is substantially cylindrical in shape, and of substantially constant radius. The valve body 72 is arranged in a close sliding fit within the bore 92 of the valve stem 44, and a small clearance 74 is provided between the valve body 72 of the valve pin 46 and the wall 56 of the surrounding bore 42, so as to allow for sliding movement between the valve pin 46 and the surrounding bore 92. Typically, the clearance 74 is of the order of a few microns.

The valve pin 46 is provided with a fuel-receiving cavity 78 that extends through the length of the valve body 72. Specifically, the valve body 72 of the valve pin 46 comprises an annular wall 76 surrounding the fuel-receiving cavity 78. In this embodiment, the fuel-receiving cavity 78 opens onto a lowermost end of the valve pin 46, such that the end of the valve pin 46 defines a fuel gallery in the form of an inlet 98 through which fuel can flow into the fuel-receiving cavity 78. In this way, the fuel-receiving cavity 78 is in fluid communication with the bore 42 of the valve stem 44.

When the valve stem 44 is arranged in a closed position, shown in FIG. 5, the bore 42 of the valve stem 44 and the fuel-receiving cavity 78 both contain high-pressure fuel. The high-pressure fuel in the bore 42 exerts an outward radial force on the wall 56 of the bore 42, and an inward radial force on the valve pin 46, tending to increase the clearance 74 between them in a manner that has already been described with reference to the first embodiment. However, the high-pressure fuel in the fuel-receiving cavity 78 exerts an outward radial force on the annular wall 76 of the valve pin 46, increasing its external diameter and thereby counteracting the tendency for the clearance 74 to increase.

When the valve stem 44 is arranged in an open position, shown in FIG. 6, the bore 42 of the valve stem 44 and the fuel-receiving cavity 78 both contain low-pressure fuel. The low-pressure fuel in the bore 42 exerts a relatively small outward radial force on the wall 56 of the bore 42, and a relatively small inward radial force on the valve pin 46, tending to increase the clearance 74 between them to a lesser degree. The low-pressure fuel in the fuel-receiving cavity 78 exerts a relatively low outward radial force on the annular wall 76 of the valve pin 46, increasing its external diameter to a correspondingly lesser extent, and thereby counteracting the tendency for the clearance 74 to increase.

It will be appreciated that, in a manner similar to that described with regard to the first embodiment, the provision of the inlet 98 between the bore 42 and the fuel-receiving cavity 78 means that the fuel pressure in the bore 42 is always at equilibrium with the fuel pressure in the fuel-receiving cavity 78. In this way, the fuel pressure in the fuel-receiving cavity 78 varies with the pressure in the bore 42, and hence varies throughout the cycle of opening and closing of the control valve 36. The fuel in the fuel-receiving cavity 78 will only distort the annular wall 76 of the valve body 72 to the extent that is necessary to maintain a constant clearance 74 between the valve body 72 of the valve stem 44 and the wall 56 of the bore 42.

Thus, in both embodiments, the invention provides effective means for reducing the static leak between the valve member 46 and the valve housing 44, thereby reducing fuel and energy loss, and increasing the efficiency of the engine.

Although in the first embodiment described above the valve body 72 of the valve stem 44 is integral with a remaining portion of the valve stem 44, and the cavity 78 is a drilled cavity plugged by an insert 82, it will be appreciated that the cavity may be introduced into the valve stem by any suitable means. For example, the valve body may be formed separately from the remainder of the valve stem in the form of a cylinder that is closed at one end. The valve body may then be attached to the remainder of the valve stem, for example by welding, so as to provide an internal cavity in the valve stem.

Fuel need not necessarily be received into the bore via a fuel gallery, but may be received into the bore by any suitable arrangement of flow passages within the control valve. The fuel in any of the flow passages in the control valve may act to the increase the radial clearance between the valve body and the wall of the bore. If the fuel gallery is present, it may be of any suitable shape, and arranged at any suitable location.

Although in the embodiments described the fuel supply is a high-pressure fuel supply, it will be appreciated that distortion effects will be also present at lower fuel pressures, and thus the fuel may be supplied at any pressure above ambient pressure.

It should be appreciated that various other modifications and improvements can be made without departing from the scope of the invention as defined in the claims.

The invention claimed is:

1. A control valve assembly for controlling fuel pressure in a control chamber of a fuel injector, the control valve assembly comprising a valve member arranged in a bore provided in a valve housing wherein the valve member moves between a closed position which prevents fluid communication between the control chamber and a low pressure drain and an open position which provides fluid communication between the control chamber and the low pressure drain, at least one of the valve member and the valve housing being moveable with respect to the other, wherein the valve member comprises a fuel-receiving cavity which receives fuel that distorts at least a portion of the valve member so as to increase an external dimension thereof such that the fuel-receiving cavity is in fluid communication with the low pressure drain when the valve member is in the open position and such that the fuel-receiving cavity is not in fluid communication with the low pressure drain when the valve member is in the closed position, wherein the fuel-receiving cavity is a drilled cavity which extends into the valve member from a first end and wherein the drilled cavity is plugged by an insert which prevents fluid communication through the drilled cavity from the fuel receiving cavity to the first end.

2. The control valve assembly of claim 1, wherein at least one of the valve member and the valve housing is engageable with a valve seating to control fuel pressure within the control chamber, and wherein fuel pressure within the fuel-receiving cavity is variable depending on whether the valve member is engaged with the valve seating.

3. The control valve assembly of claim 1, wherein the valve member comprises an annular wall surrounding the fuel-receiving cavity, so that fuel received in the fuel-receiving cavity exerts an outward radial force on at least a portion of the annular wall, so as to increase an external diameter thereof.

4. The control valve assembly of claim 1, wherein the valve member comprises a valve body arranged in a close sliding fit in the bore, and at least a portion of the fuel-receiving cavity extends into the valve body.

5. The control valve assembly of claim 4, wherein the bore is arranged to receive fuel from a high-pressure fuel supply, and wherein fuel received in the bore acts to distort the valve housing and/or the valve member so as to increase a radial clearance defined between the valve body and a wall of the bore.

6. The control valve assembly of claim 5, wherein the bore defines a fuel gallery for receiving fuel from the high-pressure fuel supply, and fuel received in the fuel gallery acts to distort the valve housing and/or the valve member so as to increase the radial clearance.

7. The control valve assembly of claim 6, wherein fuel received in the fuel-receiving cavity acts to distort the valve body so as at least partially to counteract the increase in the radial clearance caused by the fuel received in the bore.

8. The control valve assembly of claim 6, wherein the fuel-receiving cavity is in fluid communication with the fuel gallery, such that fuel pressure in the fuel-receiving cavity is the same as fuel pressure in the fuel gallery.

9. The control valve assembly of claim 8, wherein the valve member comprises an inlet in fluid communication with the fuel-receiving cavity and the fuel gallery.

10. The control valve assembly of claim 4, wherein, when fuel is absent from the bore and the fuel-receiving cavity, the valve body is of substantially constant external diameter.

11. The control valve assembly of claim 1, wherein at least one of the valve member and the valve housing is moveable with respect to the other between a first position in which the control chamber, the fuel-receiving cavity and a high-pressure fuel supply are arranged in mutual fluid communication, and a second position in which the control chamber is in fluid communication with a low-pressure fuel drain.

12. The control valve assembly of claim 1, wherein the valve member is moveable with respect to the valve housing.

13. A fuel injector comprising the control valve assembly of claim 1, a control chamber, and an injection nozzle, the control chamber being arranged to control movement of a valve needle to control the injection of fuel from the injection nozzle.

14. The control valve assembly of claim 11 wherein the control chamber is not in fluid communication with the low-pressure drain in the first position.

15. The fuel injector of claim 13 wherein a position of the valve member relative to the housing determines a pressure within the control chamber and the pressure within the control chamber opens and closes the valve needle.

* * * * *